(12) United States Patent
Chen

(10) Patent No.: US 10,328,505 B2
(45) Date of Patent: Jun. 25, 2019

(54) CIRCULAR SAW

(71) Applicant: REXON INDUSTRIAL CORP., LTD., Taichung (TW)

(72) Inventor: Jung-Huo Chen, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

(21) Appl. No.: 15/364,312

(22) Filed: Nov. 30, 2016

(65) Prior Publication Data

US 2017/0151615 A1    Jun. 1, 2017

(30) Foreign Application Priority Data

Dec. 1, 2015    (TW) .............................. 104140175 A

(51) Int. Cl.
  *B23D 47/00* (2006.01)
  *B23D 47/02* (2006.01)
  *B23D 45/04* (2006.01)

(52) U.S. Cl.
  CPC ......... *B23D 47/005* (2013.01); *B23D 45/048* (2013.01); *B23D 47/00* (2013.01); *B23D 47/02* (2013.01)

(58) Field of Classification Search
  CPC .... B23D 47/005; B23D 47/02; B23D 45/048; B23D 47/00
  USPC ... 83/397, 471.3, 490, 473, 477.1, 581, 544, 83/698.11, 478, 573, 860, 589, 676
  See application file for complete search history.

(56) References Cited

U.S. PATENT DOCUMENTS

| | | | | |
|---|---|---|---|---|
| 5,241,888 A * | 9/1993 | Chen | .................... | B23D 45/046 83/471.3 |
| 8,511,211 B2 * | 8/2013 | Cox | ....................... | B27G 19/02 83/397 |
| 9,021,930 B2 * | 5/2015 | Kani | .................... | B23D 45/048 30/374 |
| 2007/0163409 A1 * | 7/2007 | Nishikawa | ........... | B23D 45/048 83/485 |
| 2008/0216627 A1 * | 9/2008 | Taylor | .................. | B23D 45/048 83/468.3 |
| 2009/0158904 A1 * | 6/2009 | Chen | .................... | B23D 59/006 83/162 |
| 2011/0252936 A1 * | 10/2011 | Kani | .................... | B23D 45/048 83/162 |

(Continued)

*Primary Examiner* — Ghassem Alie
*Assistant Examiner* — Nhat Chieu Q Do
(74) *Attorney, Agent, or Firm* — Bacon & Thomas, PLLC

(57) ABSTRACT

A circular saw includes a worktable, a sliding unit including a mounting base mounted on the worktable and providing an accommodation slot and two sliding shafts axially slidably inserted through the mounting base at two opposite sides of the accommodation slot in a parallel manner, and a cutting unit including a saw arm pivotally connected between the two sliding shafts and providing an accommodation portion and a saw blade pivotally mounted at the saw arm. Thus, when the saw arm is in an upper limit position, the accommodation of the saw arm is partially disposed outside the accommodation slot. When the saw arm is in a lower limit position, the accommodation portion is received in the accommodation slot. Subject to the design described above, the circular saw achieves the effects of reduced overall dimension, low vibration and high cutting accuracy.

3 Claims, 5 Drawing Sheets

(56) References Cited

U.S. PATENT DOCUMENTS

2014/0366697 A1* 12/2014 Lin .................. B23D 45/048
                                              83/471.3

\* cited by examiner

CIRCULAR SAW

BACKGROUND OF THE INVENTION

1. Field of the Invention

The present invention relates to circular saw technology and more particularly, to a circular saw, which has a reduced dimension, avoids vibration and improves accuracy.

2. Description of the Related Art

U.S. Pat. No. 5,241,888 and US Publication No. 2007/0163409 both disclose a sliding type circular saw. According to these two prior art designs, the worktable must be large enough to fit the travel path of the saw cutting device and the length of the saw arm so as to provide sufficient support to the workpiece. The large size of the worktable results in a large overall dimension of the circular saw. On the other hand, since the length of the arm of force of the saw cutting device is dependent on the distance it extends out of the sliding platform, these two prior art designs cannot effectively shorten this distance. Due to the longer arm of force, the saw cutting device can vibrate during a cutting operation, affecting the cutting accuracy.

SUMMARY OF THE INVENTION

The present invention has been developed in view of the aforesaid circumstances. It is one of the main objects of the present invention to provide a circular saw, which significantly reduces vibration during operation and improves the cutting accuracy.

To achieve this and other objects of the present invention, a circular saw comprises a worktable, a sliding unit, and a cutting unit. The sliding unit comprises a mounting base and two sliding shafts. The mounting base is mounted on the worktable, and comprises an accommodation slot located on one side thereof and facing toward the worktable. The two sliding shafts are axially and slidably inserted through the mounting base at two opposite lateral sides of the accommodation slot. The cutting unit comprises a saw arm pivotally connected between the two sliding shafts of the sliding unit and biasable relative to the sliding shafts between an upper limit position and a lower limit position, and a saw blade pivotally mounted at the saw arm. The saw arm comprises an accommodation portion. Thus, when the saw arm is disposed in the upper limit position, at least a part of the accommodation of the saw arm is disposed outside the accommodation slot of the mounting base of the sliding unit. When the saw arm is disposed in the lower limit position, the accommodation portion of the saw arm is received in the accommodation slot of the mounting base of the sliding unit. Thus, subject to the design described above, the circular saw achieves the effects of reduced overall dimension, low vibration and high cutting accuracy.

Preferably, the sliding unit further comprises a sliding cover plate fixedly mounted on the two sliding shafts at a top side. The cutting unit further comprises a saw blade guard and a link. The saw blade guard is pivotally connected to the saw arm and adapted for guarding the saw blade. The link has one end thereof connected to the sliding cover plate, and an opposite end thereof pivotally coupled to the saw blade guard. Thus, when the saw arm is biased from the upper limit position to the lower limit position, the saw blade guard is dragged by the link to bias relative to the saw blade, enabling the saw blade to expose outside the saw blade guard, achieving the effect of enhanced cutting operation smoothness.

Other and further advantages and features of the present invention will be understood by reference to the following specification in conjunction with the accompanying drawings.

DETAILED DESCRIPTION OF THE INVENTION

Figure 1:
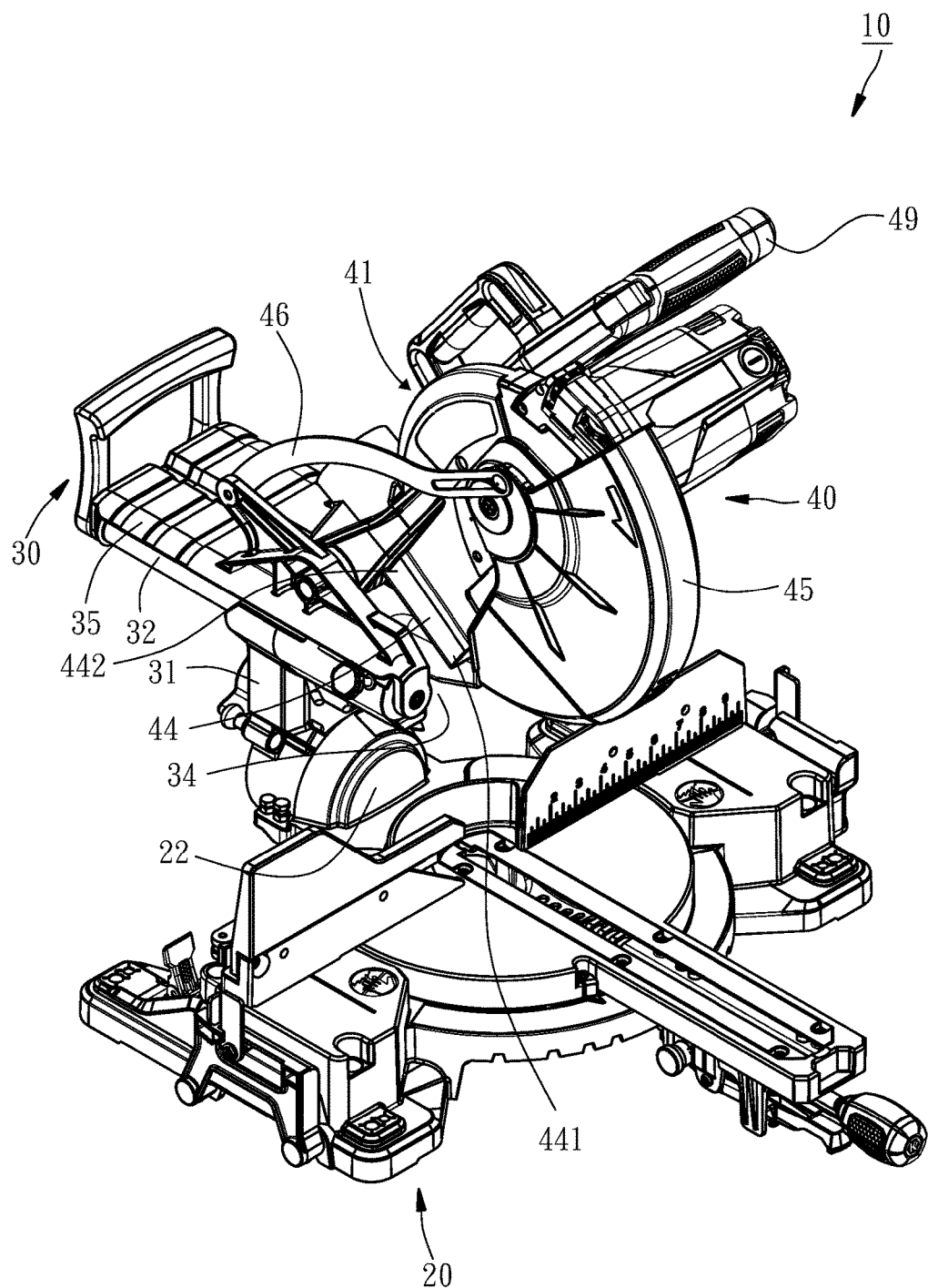
FIG. 1 is an oblique top elevational view of a circular saw in accordance with the present invention.

Referring to FIG. 1, a circular saw 10 in accordance with the present invention is shown. The circular saw 10 comprises a worktable 20, a sliding unit 30, and a cutting unit 40.

The worktable 20 is mounted on a table or other supporting surface for holding a workpiece for cutting, comprising a support member 22 (a supporting bracket for supporting the cutting unit 40) upwardly extended from a back side thereof.

Figure 3:
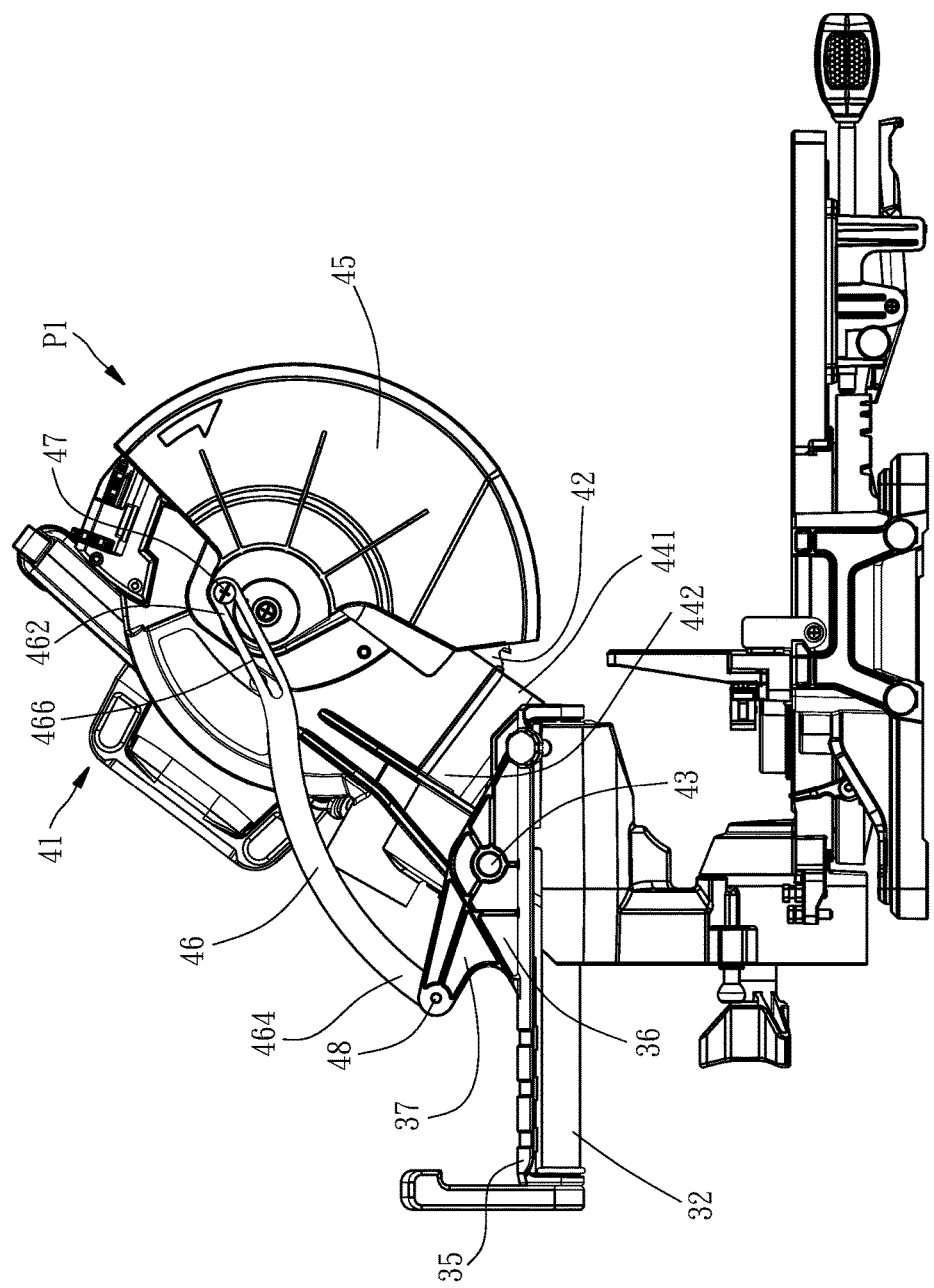
FIG. 3 is a side view of the present invention, illustrating the saw arm in the upper limit position.

Referring to FIG. 3 and FIG. 1 again, the sliding unit 30 comprises a mounting base 31, and two sliding shafts 32 arranged in parallel. The mounting base 31 has a bottom side thereof fixedly connected to the support member 22 of the worktable 20, and an accommodation slot 34 located on a top side thereof and facing toward the worktable 20. The two sliding shafts 32 are axially slidably inserted through the mounting base 31, e.g., through slots or channels in the mounting base 31, at two opposite lateral sides of the accommodation slot 34. The sliding unit 30 further comprises a sliding cover plate 35 fixedly connected to the sliding shafts 32 at a top side, e.g., using screws, bolts, welding, or other fixed connection devices. The sliding cover plate 35 comprises two opposing first pivot portions 36, and a second pivot portion 37 backwardly extended from one of the first pivot portions 36 in a direction away from the accommodation slot 34 of the mounting base 31.

Figure 2:
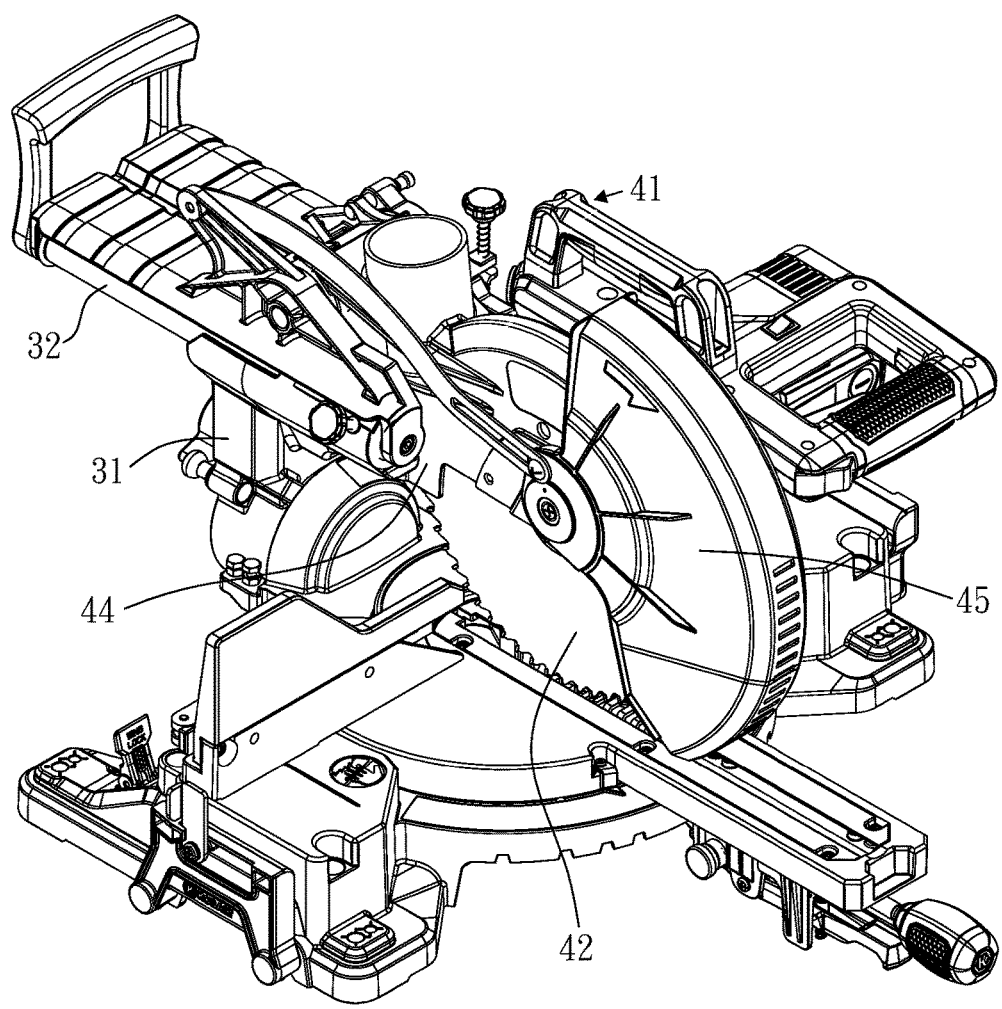
FIG. 2 is another elevational view of the present invention, illustrating the saw arm in the lower limit position.
Figure 4:
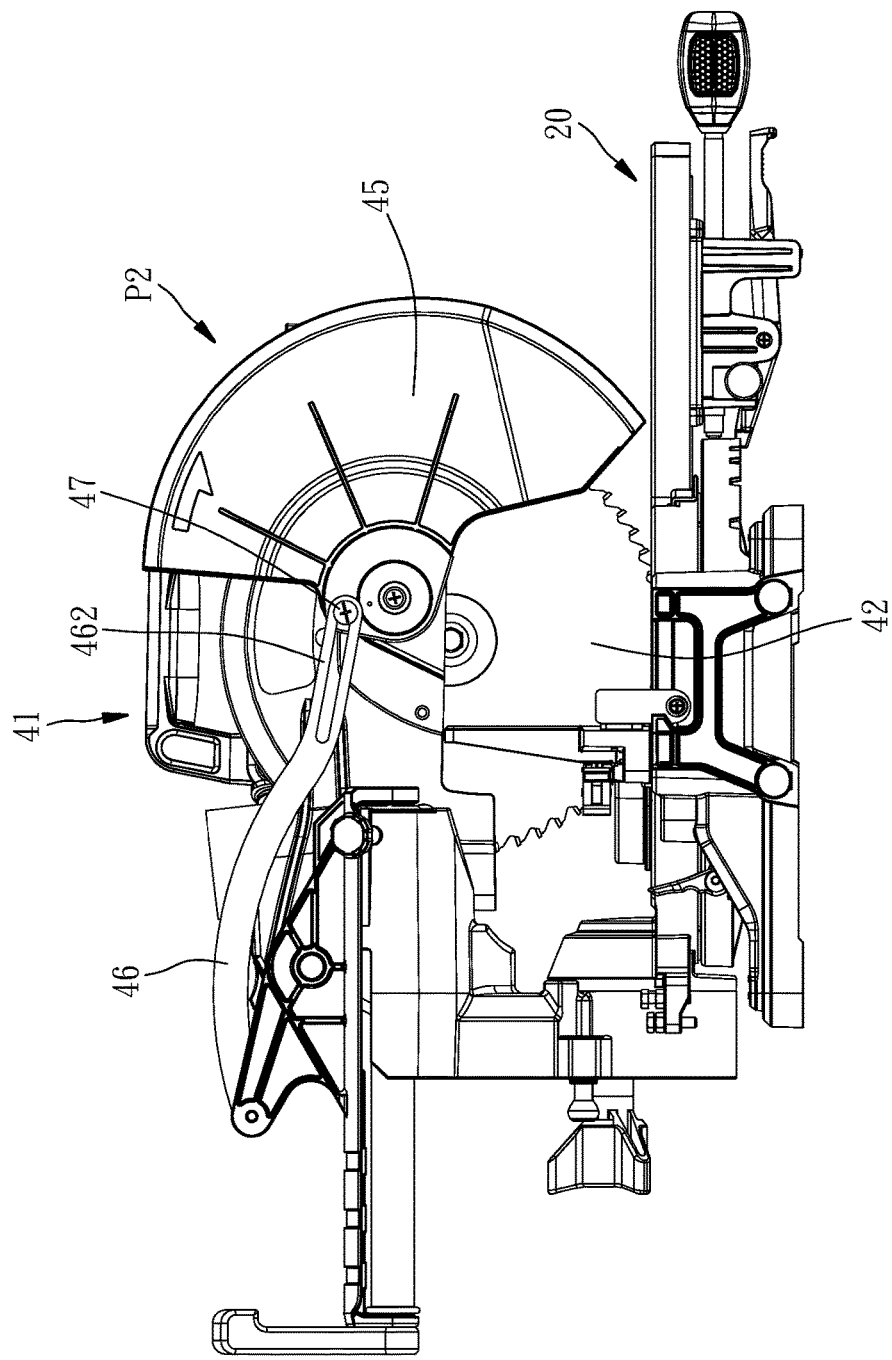
FIG. 4 is another side view of the present invention, illustrating the saw arm in the lower limit position.

The cutting unit 40 comprises a saw arm 41, a saw blade 42 pivotally mounted at the saw arm 41, and a grip 49. The saw arm 41 is pivotally connected between the two sliding shafts 32 by a first pivot pin 43 so that on the one hand, the saw arm 41 can be moved with the sliding shafts 32 to carry the saw blade 42 back and forth relative to the worktable 20, and on the other hand, the saw arm 41 can be biased relative to the sliding shafts 32 to carry the saw blade 42 up and down between an upper limit position P1 and a lower limit position P2 relative to the worktable 20. The saw arm 41 comprises an accommodation portion 44. The accommodation portion 44 is disposed in proximity to the first pivot pin 43, having a first end 441 and a second end 442. In this embodiment, when the saw arm 41 is set in the upper limit position P1, as shown in FIG. 1 and FIG. 3, the second end 442 of the accommodation portion 44 is kept away from the accommodation slot 34 of the mounting base 31; but when the saw arm 41 is set in the lower limit position P2, as shown in FIG. 2 and FIG. 4, the second end 442 of the accommodation portion 44 is received in the accommodation slot 34 of the mounting base 31. However, when either the saw arm 41 is disposed in the upper limit position P1 or the lower limit position P2, the first end 441 of the accommodation portion 44 is constantly disposed outside the accommodation slot 34 of the mounting base 31, e.g., the first end 441 is always positioned outside the channel formed by the accommodation slot 34. The cutting unit 40 further comprises a saw blade guard 45 and a link 46. The saw blade guard 45 is pivotally connected to the saw arm 41 to guard the saw blade 42. The link 46 comprises a first end portion 462, an elongated sliding slot 466 located on the first end portion 462, and an opposing second end portion 464 opposite to the first end portion 462. The elongated sliding slot 466 of the link 46 is coupled to a locating member 47 at the saw blade guard 45, e.g., in the form of a screw or bolt or other slidable retaining/locating member. The second end portion 464 of the link 46 is pivotally connected to the second pivot portion 37 of the sliding cover plate 35 by a second pivot pin 48.

Figure 5:
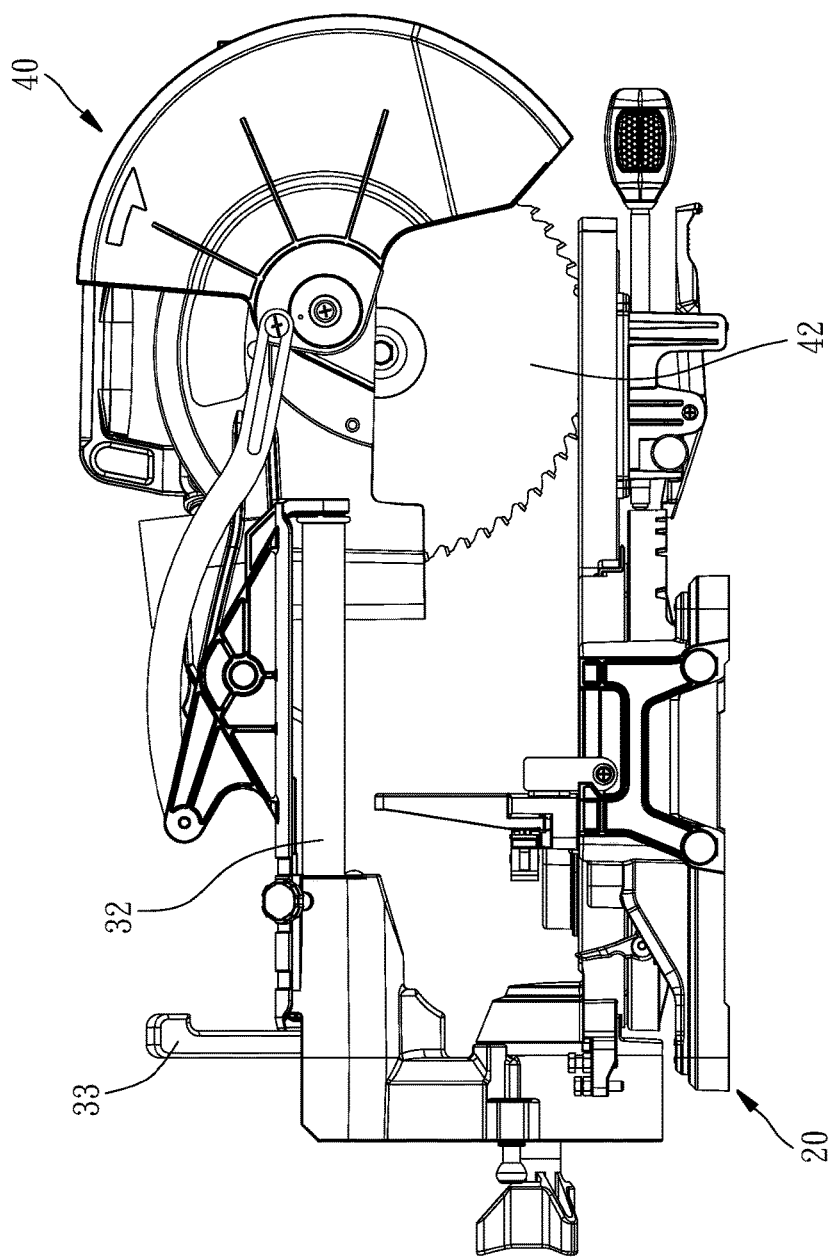
FIG. 5 is a schematic side view of the present invention, illustrating the cutting unit moved relative to the worktable.

In operation, the user can operate the grip 49 to move the saw arm 41 downwardly toward the worktable 20. At this time, the saw blade 42 is carried by the saw arm 41 from the upper limit position P1 shown in FIG. 3 toward the lower limit position P2 shown in FIG. 4, and at the same time, the locating member 47 is pulled by the first end portion 462 of the link 46 to prohibit movement of the saw blade guard 45 with the saw blade 42, and thus, the saw blade 42 is gradually moved out of the saw blade guard 45. When the saw arm 41 reaches the lower limit position P2, as shown in FIG. 4, the second end 442 of the accommodation portion 44 of the saw arm 41 is received in the accommodation slot 34 of the mounting base 31. At this time, the user can operate the grip 49 to move the two sliding shafts 32, thereby carrying the cutting unit 40 back and forward relative to the worktable 20, as shown in FIG. 5. When moving the cutting unit 40 back and forth relative to the worktable 20, the exposed part of the saw blade 42 is forced to cut the workpiece on the worktable 20.

Thus, the circular saw 10 of the present invention initially significantly shortens the distance the cutting unit 40 extends out of the mounting base 31, but maintains the saw-cutting stroke of the cutting unit 40 by the movement of the sliding shafts 32, and thus, the overall dimension of the circuit saw is significantly reduced. Further, since the length of the arm of force is significantly reduced, cutting vibration is greatly reduced, achieving the effect of improved cutting accuracy. Further, since the link 46 is provided for driving the saw blade guard 45 to bias during the up and down movement of the saw arm 41, the effect of enhanced operating smoothness of the cutting operation is achieved.

What is claimed is:

1. A circular saw, comprising:
a worktable;
a sliding unit comprising a mounting base, two sliding shafts, and an accommodation slot located on a top side of the mounting base and facing forward of said worktable, said mounting base being mounted on said worktable and said two sliding shafts being axially and slidably inserted through said mounting base at two opposite lateral sides of said accommodation slot; and
a cutting unit comprising a saw arm pivotally connected between said two sliding shafts of said sliding unit and biasable relative to said sliding shafts between an upper limit position and a lower limit position and a saw blade pivotally mounted at said saw arm, said saw arm comprising an accommodation portion and configured in a way such that when said saw arm is disposed in said upper limit position, at least a part of said accommodation portion of said saw arm is disposed outside said accommodation slot of said mounting base of said sliding unit, and when said saw arm is disposed in said lower limit position, another part of said accommodation portion of said saw arm is received in said accommodation slot of said mounting base of said sliding unit,
wherein said sliding unit further comprises a sliding cover plate mounted on said two sliding shafts at a top side and configured to cover an entirety of top sides of the two sliding shafts, said sliding cover plate comprising a first pivot portion and a gap corresponding to the accommodation slot at a front end thereof, said saw arm is pivotally connected to said first pivot portion of said sliding cover plate with a first pivot pin,
wherein the accommodation slot is configured in a way such that the accommodation slot is between the two sliding shafts on a front end of the mounting base, and
wherein said accommodation portion comprises a first end and an opposing second end, said second end of said accommodation portion being moved out of said accommodation slot when said saw arm is moved to said upper limit position, the said second end of said accommodation portion being received in said accommodation slot when said saw arm is moved to said lower limit position and said first end is always positioned outside the accommodation slot.

2. The circular saw as claimed in claim 1, wherein said sliding cover plate further comprises a second pivot portion extended from said first pivot portion in a direction away from said accommodation slot; said cutting unit further comprises a saw blade guard and a link, said saw blade guard being pivotally connected to said saw arm and adapted for guarding said saw blade, said saw blade guard comprising a locating member, said link comprising a first end portion connected to said locating member of said saw blade guard and an opposing second end portion connected to said second pivot portion of said sliding cover plate by a second pivot pin.

3. The circular saw as claimed in claim 2, wherein said link further comprises an elongated sliding slot located on said first end portion and coupled to said locating member.

* * * * *